(12) United States Patent
Postelnicu et al.

(10) Patent No.: US 9,679,573 B1
(45) Date of Patent: *Jun. 13, 2017

(54) SYSTEM AND METHOD FOR ADDING PITCH SHIFT RESISTANCE TO AN AUDIO FINGERPRINT

(71) Applicant: Google Inc., Mountain View, CA (US)

(72) Inventors: Gheorghe Postelnicu, Zürich (CH); Matthew Sharifi, Kilchberg (CH); Yaniv Bernstein, Brunswick East (AU)

(73) Assignee: Google Inc., Mountain View, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 14/842,565

(22) Filed: Sep. 1, 2015

Related U.S. Application Data

(63) Continuation of application No. 13/723,034, filed on Dec. 20, 2012, now Pat. No. 9,159,327.

(51) Int. Cl.
*G06F 17/00* (2006.01)
*G10L 19/018* (2013.01)
*G06F 17/30* (2006.01)
*H04N 21/233* (2011.01)

(52) U.S. Cl.
CPC ...... *G10L 19/018* (2013.01); *G06F 17/30017* (2013.01); *G06F 17/30743* (2013.01); *G06F 17/30758* (2013.01); *H04N 21/233* (2013.01)

(58) Field of Classification Search
CPC .......... G06F 17/30743; G06K 9/00523; G06K 9/00536; G10H 2240/141; G10H 2210/066; G10H 1/366; G10H 2210/076; G10H 3/125

See application file for complete search history.

(56) References Cited

U.S. PATENT DOCUMENTS

| | | | | |
|---|---|---|---|---|
| 4,852,181 A | * | 7/1989 | Morito | G10L 15/20 704/233 |
| 6,434,520 B1 | * | 8/2002 | Kanevsky | G06F 17/30746 704/243 |
| 7,277,766 B1 | * | 10/2007 | Khan | G06F 17/30743 380/237 |
| 7,516,074 B2 | * | 4/2009 | Bilobrov | G06F 17/30743 704/270 |
| 8,275,177 B2 | | 9/2012 | Fiebrink et al. | |
| 8,290,918 B1 | * | 10/2012 | Ioffe | G06F 17/3002 707/698 |

(Continued)

OTHER PUBLICATIONS

Baluja, et al., "Content Fingerprinting Using Wavelets," 3rd European Conference on Visual Media Production, 2006, 10 pages.

(Continued)

*Primary Examiner* — Thomas Maung
(74) *Attorney, Agent, or Firm* — Fenwick & West LLP

(57) ABSTRACT

Systems and techniques for adding pitch shift resistance to an audio fingerprint are presented. In particular, an audio track for a media file is received. A first audio fingerprint for the audio track with a first pitch shift and an Nth audio fingerprint for the audio track with an Mth pitch shift are generated, where N is an integer greater than or equal to two and M is an integer greater than or equal to two. A combined audio fingerprint is generated from at least the first audio fingerprint and the Nth audio fingerprint.

20 Claims, 12 Drawing Sheets

(56) References Cited

U.S. PATENT DOCUMENTS

| | | | |
|---|---|---|---|
| 8,341,412 B2* | 12/2012 | Conwell | G06Q 10/00 |
| | | | 713/176 |
| 8,458,737 B2 | 6/2013 | Topchy et al. | |
| 8,468,357 B2 | 6/2013 | Roberts et al. | |
| 8,825,626 B1* | 9/2014 | Wallace | G06F 17/30994 |
| | | | 707/697 |
| 9,244,937 B2* | 1/2016 | Akirav | G06F 17/30156 |
| 2001/0044719 A1 | 11/2001 | Casey | |
| 2002/0083060 A1 | 6/2002 | Wang et al. | |
| 2003/0191764 A1 | 10/2003 | Richards | |
| 2005/0131939 A1* | 6/2005 | Douglis | H03M 7/30 |
| 2005/0213826 A1* | 9/2005 | Neogi | H04N 19/467 |
| | | | 382/232 |
| 2006/0013451 A1* | 1/2006 | Haitsma | G06F 17/3002 |
| | | | 382/124 |
| 2006/0190450 A1* | 8/2006 | Holm | G06F 17/30743 |
| 2006/0229878 A1* | 10/2006 | Scheirer | G10H 1/0008 |
| | | | 704/273 |
| 2008/0270729 A1* | 10/2008 | Reddy | G06F 17/30598 |
| | | | 711/170 |
| 2010/0158488 A1* | 6/2010 | Roberts | G06F 17/30743 |
| | | | 386/334 |
| 2011/0035805 A1* | 2/2011 | Barkan | G06F 21/10 |
| | | | 726/26 |
| 2011/0099351 A1* | 4/2011 | Condict | G06F 3/0608 |
| | | | 711/216 |
| 2011/0273455 A1 | 11/2011 | Powar et al. | |
| 2012/0233135 A1* | 9/2012 | Tofano | G06F 17/30489 |
| | | | 707/692 |

OTHER PUBLICATIONS

Media Hedge, "Digital Fingerprinting," White Paper, Civolution and Gracenote, 2010, 12 pages.

Milano, Dominic, "Content Control: Digital Watermarking and Fingerprinting," White Paper, Rhozet, a business unit of Harmonic Inc., Last accessed Jul. 31, 2012, 11 pages.

Lu, Jian, "Video fingerprinting for copy identification: from research to industry applications," Proceedings of SPIE—Media Forensics and Security XI, vol. 7254, Jan. 2009, 16 pages.

Lu, Jian, "Video Fingerprinting and Applications: a review," Media Forensics & Security Conference, 2009, San Jose, CA, 31 pages.

Notice of Allowance for U.S. Appl. No. 13/723,034, dated Jun. 17, 2015, 47 pages.

* cited by examiner

SYSTEM AND METHOD FOR ADDING PITCH SHIFT RESISTANCE TO AN AUDIO FINGERPRINT

CROSS-REFERENCE TO RELATED APPLICATIONS

This application is a continuation of U.S. patent application Ser. No. 13/723,034, filed Dec. 20, 2012, and entitled, "SYSTEM AND METHOD FOR ADDING PITCH SHIFT RESISTANCE TO AN AUDIO FINGERPRINT," the entirety of which is incorporated herein by reference.

TECHNICAL FIELD

This disclosure relates generally to audio matching, and more specifically, to adding pitch shift resistance to an audio fingerprint.

BACKGROUND

Audio matching provides for identification of a recorded audio sample by comparing an audio sample to a set of reference samples. One example of a recorded audio sample can be an audio track of a video. To make the comparison, an audio sample can be transformed to a time-frequency representation of the sample by using, for example, a short time Fourier transform (STFT). Using the time-frequency representation, interest points that characterize time and frequency locations of peaks or other distinct patterns of the spectrogram can then be extracted from the audio sample. Fingerprints can be computed as functions of sets of interest points. Fingerprints of the audio sample can then be compared to fingerprints of reference samples to determine the identity of the audio sample.

Different types of fingerprints can be used for audio matching. For example, audio-id fingerprints can be generated by incorporating interest points of an audio sample related to every aspect of the audio sample to aid in identifying the exact same sound recording. Because audio-id is designed for high precision and exactness, audio matching using solely audio-id fingerprints can fail to identify pitch-shifted audio samples of a reference as the reference. In a media sharing service, the media sharing platform is reliant on users to provide uploaded content. In general, the media sharing service provider has little control over what content users can upload into the system, beyond limiting acceptable file formats, for example. An audio matching system that has no control over the content (e.g., uploaded media content that it is to be matched against a database of audio-id fingerprints) benefits from being resistant to pitch-shifted content uploaded by users. Therefore, there exists a need to improve audio matching to be more resistant to pitch-shifting.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a media component, a fingerprint component and a combination component. The media component receives an audio track for a media file. The fingerprint component generates a first audio fingerprint for the audio track with a first pitch shift and an Nth audio fingerprint for the audio track with an Mth pitch shift, where N is greater than or equal to two and M is greater than or equal to two. The combination component generates a combined audio fingerprint from at least the first audio fingerprint and the Nth audio fingerprint.

Additionally, a non-limiting implementation provides for receiving an audio track for a media file, generating a first audio fingerprint for the audio track with a first pitch shift, generating an Nth audio fingerprint for the audio track with an Mth pitch shift, and generating a combined audio fingerprint from at least the first audio fingerprint and the Nth audio fingerprint.

In accordance with another implementation, a system includes a fingerprint component and a combination component. The fingerprint component generates a plurality of audio fingerprints for the audio track. The plurality of audio fingerprints comprise unique pitch shifts. The combination component generates a combined audio fingerprint from the plurality of audio fingerprints.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
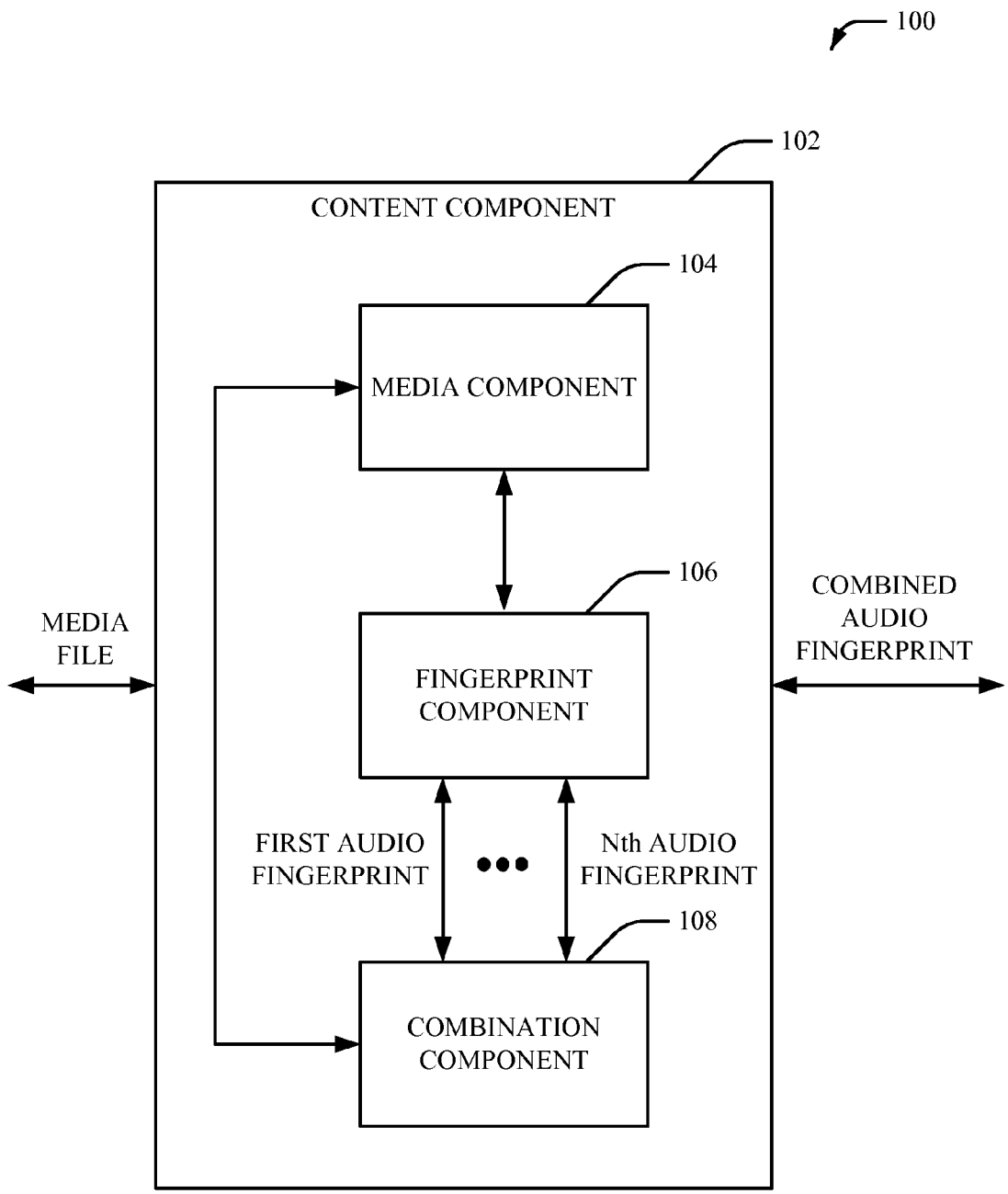
FIG. 1 illustrates a high-level block diagram of an example content component for adding pitch shift resistance to an audio fingerprint, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Many conventional service providers allow users to upload media content (e.g., audio and/or video content) to a server (e.g., a media content server). The media content can then be delivered (e.g., streamed) to other users. Typically, the service providers provide the network infrastructure for the users, but very little else. Therefore, these service providers have very limited control over what media content is being uploaded and/or streamed by users, such as, e.g., copyrighted media content. As such, audio matching can be implemented to identify a recorded audio sample by comparing an audio sample to a set of reference samples.

Audio matching in general involves analyzing an audio sample, for example, an audio track of a video sample, for unique characteristics that can be used in comparison to unique characteristics of reference samples to identify the audio sample. As a starting point for this analysis, a spectrogram of the audio signal can be constructed. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at one or more specific frequencies and measure amplitude of the audio sample at that specific frequency over time. The audio sample can be run through additional filters to individually isolate a set of frequencies to measure the amplitude of the set over time. A spectrogram can be created by combining all the measurements over time on the frequency axis to generate a spectrogram image of frequency amplitudes over time. A second technique involves using short-time Fourier transform ("STFT") to break down an audio sample into time windows, where each window is Fourier transformed to calculate a magnitude of the frequency spectrum for the duration of each window. Combining a plurality of windows side by side on the time axis of the spectrogram creates an image of frequency amplitudes over time. Other techniques, such as wavelet transforms, can also be used to construct a spectrogram.

Creating and storing in a database an entire spectrogram for a plurality of reference samples can use large amounts of storage space and affect scalability of an audio matching system. Therefore, it can be desirable to instead calculate and store compact fingerprints of reference samples versus an entire spectrogram. One method of calculating fingerprints is to first determine individual interest points that identify unique characteristics of local features of the time-frequency representation of the reference sample. Fingerprints can then be computed as functions of sets of interest points.

As such, audio fingerprinting technology can be implemented to identify a recorded audio sample. Audio fingerprinting technology employs audio fingerprints to identify near-duplicate audio files, and/or portions thereof. In one example, audio fingerprinting can be employed in identifying copyrighted material in media content (e.g., a video). For example, an automated system can match user uploaded video clips against a large reference database of fingerprints for partner provided content using audio fingerprint technology.

In one example, audio-id fingerprints can be generated by incorporating interest points of an audio sample related to every aspect of the audio sample to aid in identifying the exact same sound recording. However, audio-id matching can fail to match two different audio recordings. Additionally, audio-id fingerprints can be susceptible to pitch shift distortions interfering with a potential match. For example, tempo of an audio sample (e.g., an original audio track) can be sped up to fit into a certain time slot (e.g., a particular time slot of a video file), which can cause pitch shifting (e.g., a pitch shifted audio sample). In another example, popular encoding codecs such as AAC, MP3, FLAC, etc., can cause subtle changes, such as pitch shifts, to the underlying audio sample during encoding. These subtle changes can then prevent an encoded audio sample from matching a decoded or differently encoded version of the same audio sample if the sole mechanism for the audio matching is audio-id matching as implemented in conventional systems. Because audio-id matching is designed for high precision and exactness, audio matching using solely audio-id fingerprints can fail to identify pitch-shifted audio samples of a reference as the reference. As such, conventional audio fingerprinting technology may not consistently identify near-duplicate audio files, and/or portions thereof.

One way to make audio-id matching more resistant to pitch shifts is to generate multiple audio-id fingerprints for individual reference samples with different audio-id fingerprints corresponding to different degrees of pitch shifts. For example, each reference sample in a reference sample database can have a clean (e.g., non pitch shifted fingerprint) and different fingerprints associated with different pitches of the clean reference sample. Storing and using multiple fingerprints for each reference sample in a database including millions or billions of reference samples can create scalability difficulties related to storage and matching efficiency in such a large scale system.

To that end, techniques for adding pitch shift resistance to an audio fingerprint are presented. For example, an audio fingerprint can be generated and/or modified to provide improved resistance to pitch shifting. In one example, the audio fingerprint can be generated from an audio file. In another example, the audio fingerprint can be an audio fingerprint uploaded to a server (e.g., a server that includes a library of audio fingerprints for audio tracks). Therefore, the audio fingerprint uploaded to the server can be modified to provide improved resistance to pitch shifting. Pitch shift resistance can be added to an existing audio fingerprint while preserving previous features of the existing audio fingerprint. As such, an existing audio fingerprint can be enriched for improved resistance to pitch shifting. Furthermore, pitch shift resistance can be added without increasing size of the existing audio fingerprint. For example, the byte-level structure of the existing audio fingerprint can be altered. Therefore, an improved audio fingerprint can be generated (e.g., an improved audio fingerprint that is more resistant to pitch shifting than a conventional audio fingerprint). The improved audio fingerprint can include a different pitch (e.g., a different pitch shift) than the audio file while maintaining the same tempo as the audio file. In addition, the improved audio fingerprint can be implemented in current audio matching system architectures. Accordingly, a single audio fingerprint can be maintained (e.g., on a server) instead of multiple fingerprints with different pitches for an audio file (e.g., the improved audio fingerprint can increase storage capacity in an audio matching system).

Referring initially to FIG. 1, there is illustrated an example system 100 that can generate an audio fingerprint with improved pitch shift resistance, according to an aspect of the subject disclosure. In one example, the system 100 can be implemented on or in connection with a server that hosts user-uploaded media content. Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

Specifically, the system 100 can provide a content component with a media feature (e.g., media component 104), a fingerprint feature (e.g., fingerprint component 106) and a combination feature (e.g., combination component 108) that can be utilized in, for example, a media content application. The media feature can receive an audio track (or an audio fingerprint) for a media file. The fingerprint feature can generate a first audio fingerprint for the audio track with a first pitch shift and an Nth audio fingerprint for the audio track with an Mth pitch shift, where N is greater than or equal to two and M is greater than or equal to two. A pitch shift can be a positive pitch shift, a negative pitch shift or zero (e.g., non-shifted). The combination feature can generate a combined audio fingerprint from at least the first audio fingerprint and the Nth audio fingerprint. The system 100 can be employed by various systems, such as, but not limited to audio matching systems, content management systems, network systems, computer network systems, communication systems, router systems, server systems, high availability server systems (e.g., Telecom server systems), Web server systems, file server systems, media server systems, media content server systems, disk array systems, powered insertion board systems, cloud-based systems, and the like.

In particular, the system 100 can include a content component 102. In FIG. 1, the content component 102 includes a media component 104, a fingerprint component 106 and a combination component 108. In one example, the system 100 can be implemented in an audio matching system. The content component 102 (e.g., the media component 104) can receive a media file (e.g., MEDIA FILE shown in FIG. 1). The media component 104 can receive (or determine) an audio track (e.g., a music track) and/or an audio fingerprint for the media file. In one example, the audio track (e.g., an audio recording) can be embedded in the media file (e.g., a video file, a video clip, a video sample, etc.). For example, the media file (e.g., a video file) can be media content uploaded by a user (e.g., a user of a media sharing platform). In another example, the media file can be an audio file. It is to be appreciated that the media file can be in any recognizable media file format (e.g., video file format or audio file format), codec compression format, etc.

The fingerprint component 106 can generate a plurality of audio fingerprints (e.g., audio-id fingerprints) for the audio track. For example, the audio fingerprints can be generated based on the audio track (e.g., an audio track of a video file). The audio fingerprints can be indexed in a variety of available formats (e.g., a hash index). Each of the plurality of audio fingerprints can comprise unique pitches (e.g., different degrees of pitch shift). For example, the fingerprint component 106 can generate a first audio fingerprint for the audio track (e.g., FIRST AUDIO FINGERPRINT shown in FIG. 1) with a first pitch shift (e.g., a first pitch) and an Nth audio fingerprint for the audio track (e.g., Nth AUDIO FINGERPRINT shown in FIG. 1) with an Mth pitch shift (e.g., Mth pitch), where N and M are integers greater than or equal to two. In one example, N is equal to two (e.g., two audio fingerprints are generated). In another example, N is equal to seven (e.g., seven audio fingerprints are generated). However, it is to be appreciated that N and M can be varied based on design criteria of a particular implementation. The first pitch shift and the Mth pitch shift can include different degrees of pitch shift transformation. For example, the first pitch shift can be a 2% pitch shift transformation and the Mth pitch shift can be a −2% pitch shift transformation. However, it is to be appreciated that the first pitch shift and the Mth pitch shift can include different degrees of pitch shifting (e.g., the first pitch shift can be a 3% pitch shift transformation and the Mth pitch shift can be a −1% pitch shift transformation, etc.). It is also to be appreciated that a pitch shift can be a 0% pitch shift transformation (e.g., the first pitch shift and/or the Mth pitch shift can be implemented without a pitch shift).

The plurality of audio fingerprints can be a time series of strings. Each string can include a plurality of bytes (e.g., 100 bytes). A string can represent a portion of an audio signal (e.g., the audio track) around a certain time period of the audio signal (e.g., between 400 milliseconds and 600 milliseconds of the audio track). Each audio fingerprint generated by the fingerprint component 106 can comprise a sequence of sub-fingerprints. For example, the first audio fingerprint can include a sequence of first sub-fingerprints and the Nth audio fingerprint can include a sequence of Nth sub-fingerprints. The number of first sub-fingerprints can correspond to the number of Nth sub-fingerprints. Therefore, each fingerprint of the audio track can be composed of a time-based series of sub-fingerprints.

The sub-fingerprints (e.g., the first sub-fingerprints and the Nth audio fingerprints) can be equally sized encoded portions of the audio track. For example, the sub-fingerprints (e.g., the first sub-fingerprints and the Nth audio fingerprints) can be a string of equally sized encoded portions of an audio signal (e.g., the audio track) at a given localized window of time. In one example, the sub-fingerprints (e.g., the first sub-fingerprints and the Nth audio fingerprints) can be generated based at least in part on a hash of a spectrogram window (e.g., a min-hash technique). Therefore, a combination of computer vision techniques and/or data stream processing algorithms can be implemented to generate a fingerprint (e.g., sub-fingerprints of a fingerprint). In one example, the sub-fingerprints (e.g., the first sub-fingerprints and the Nth audio fingerprints) can be generated based at least in part on wavelets (e.g., one or more wavelet vectors).

In one non-limiting example, the fingerprint component 106 can generate a first audio fingerprint for the audio track with a first pitch (e.g., a first pitch shift), a second audio fingerprint for the audio track with a second pitch (e.g., a second pitch shift) and a third audio fingerprint for the audio track with a third pitch (e.g., a third pitch shift). For example, the second pitch can be implemented as an original pitch of the audio track. Furthermore, the first pitch can be a higher pitch than the original pitch of the audio track and the third pitch can be a lower pitch than the original pitch of the audio track. In another non-limiting example, the fingerprint component 106 can generate seven fingerprints for the audio track, where each of the seven fingerprints includes unique pitches (e.g., different degrees of pitch shifting).

The combination component 108 can generate a combined audio fingerprint (e.g., COMBINED AUDIO FINGERPRINT shown in FIG. 1) from the plurality of audio fingerprints. For example, the combination component 108 can generate a combined audio fingerprint from at least the first audio fingerprint and the Nth audio fingerprint. The combined audio fingerprint can include the same tempo as the first audio fingerprint and the Nth audio fingerprint. The combined audio fingerprint can also include a plurality of sub-fingerprints. The number of sub-fingerprints of the combined audio fingerprint can correspond to the number of sub-fingerprints in the first audio fingerprint and the Nth audio fingerprint. The combination component 108 can select a corresponding sub-fingerprint value from the sequence of first sub-fingerprints or the sequence of Nth sub-fingerprints for each sub-fingerprint byte position of the combined audio fingerprint. For example, each sub-fingerprint byte position of the combined audio fingerprint can include data (e.g., byte values) from the first audio fingerprint or the Nth audio fingerprint.

As such, the combined audio fingerprint can include byte values from at least the first audio fingerprint and the Nth audio fingerprint. A sub-fingerprint of the combined audio fingerprint can be generated as a function of a corresponding sub-fingerprint of the first audio fingerprint or the Nth audio fingerprint (e.g., a sub-fingerprint corresponding to the same point in time). In a non-limiting example, the first audio fingerprint, the Nth audio fingerprint and the combined audio fingerprint can each include three sub-fingerprints. Therefore, the first sub-fingerprint of the combined audio fingerprint can be generated as a function of the first sub-fingerprint of the first audio fingerprint and the first sub-fingerprint of the Nth audio fingerprint. Additionally, the second sub-fingerprint of the combined audio fingerprint can be generated as a function of the second sub-fingerprint of the first audio fingerprint and the second sub-fingerprint of the Nth audio fingerprint. Moreover, the third sub-fingerprint of the combined audio fingerprint can be generated as a function of the third sub-fingerprint of the first audio fingerprint and the third sub-fingerprint of the Nth audio fingerprint. Information for an audio file and/or an audio fingerprint can be condensed by implementing a hash function for all strings that are produced at a given time period. The selection of the corresponding sub-fingerprint value from the sequence of first sub-fingerprints or the sequence of Nth sub-fingerprints can be random (e.g., based on a repeatable random sequence). In one example, the combination component 108 can select a corresponding sub-fingerprint value from the sequence of first sub-fingerprints or the sequence of Nth sub-fingerprints based at least in part on a locality sensitive hash. For example, the combination component 108 can select a corresponding sub-fingerprint value from the sequence of first sub-fingerprints or the sequence of Nth sub-fingerprints based at least in part on a random number generator (e.g., a locality sensitive hashing scheme that implements a random number generator). The values generated by the random number generator can be repeatable. In another example, another hashing scheme (e.g., a weighted hashing scheme) can be implemented to select a corresponding sub-fingerprint value from the sequence of first sub-fingerprints or the sequence of Nth sub-fingerprints.

In a non-limiting example where three audio fingerprints (e.g., a first audio fingerprint, a second audio fingerprint and a third audio fingerprint) are generated by the fingerprint component 106, a corresponding sub-fingerprint value from one of the three audio fingerprints can be randomly (yet consistently) chosen for each byte position in a sub-fingerprint of the combined audio fingerprint. For example, the combination component 108 can seed a random number generator with three byte values (e.g., a byte value associated with the first audio fingerprint, a byte value associated with the second audio fingerprint and a byte value associated with the third audio fingerprint). The combination component 108 can then select the byte value which generates the highest (or lowest) random value (e.g., the combination component 108 can select either the first audio fingerprint, the second audio fingerprint or the third audio fingerprint based on the generated random value). In another example, the three bytes values (e.g., the byte values associated with the first audio fingerprint, the second audio fingerprint and the third audio fingerprint) can be input into another hashing scheme (e.g., a min-hash, a weighted min-hash, etc.). This process can be repeated for each byte of the combined audio fingerprint in order to generate the combined audio fingerprint.

In another implementation, the combination component 108 can divide each sub-fingerprint byte position of the sequence of first sub-fingerprints and the sequence of Nth sub-fingerprints into a plurality of groups. Each group of the plurality of groups can include a plurality of byte values (e.g., byte values of a sub-fingerprint). The combination component 108 can select corresponding byte values from the sequence of first sub-fingerprints or the sequence of Nth sub-fingerprints for each group of the combined audio fingerprint. For example, the sub-fingerprint byte positions of the combined audio fingerprint can be split into a number of groups. In one example, if a sub-fingerprint length of the combined audio fingerprint is 100 bytes, each sub-fingerprint of the combined audio fingerprint can be divided into 25 groups of four bytes (e.g., a first group can include bytes from index 0 to index 4, a second group can include bytes from index 5 to index 9, etc.). Then, each group can be populated with byte values from a sub-fingerprint of the first audio fingerprint or the Nth audio fingerprint, and only one. For example, a hash can be applied to the strings formed by the group in the first audio fingerprint or the nth audio fingerprint. Then, the audio fingerprint (e.g., the first audio fingerprint or the Nth audio fingerprint) with the highest corresponding hash value (or lowest corresponding hash value) can be selected. As such, each group can include byte values from a particular audio fingerprint (e.g., the first audio fingerprint or the Nth audio fingerprint).

In a non-limiting example where three audio fingerprints (e.g., a first audio fingerprint, a second audio fingerprint and a third audio fingerprint) are generated by the fingerprint component 106, the combination component 108 can populate each group with byte values from one of the three audio fingerprints. For example, the combination component 108 can populate each group with byte values from the first audio fingerprints, the second audio fingerprint or the third audio fingerprint. As such, the combined audio fingerprint can be an aggregated fingerprint that includes data from multiple audio fingerprints with different degrees of pitch (e.g., different degrees of pitch shifts). As a result, frequencies of an audio track can be shifted while keeping tempo of the audio track constant in order to generate the combined audio fingerprint. Therefore, a fingerprint with improved pitch resistance (e.g., the combined audio fingerprint) can be generated. It is to be appreciated that other techniques can be implemented to generate a combined audio fingerprint comprising different degrees of pitch (e.g., byte values from a plurality of audio fingerprints with unique pitches). For example, every Wth byte can be filled with data from a particular sub-fingerprint, where W is greater than or equal to one.

In one implementation, the combined audio fingerprint can be uploaded to a server (e.g., by the combination component 108 or another component). As such, the combined audio fingerprint can be implemented to identify one or more potential audio matches in an audio matching system. In one example, a hamming similarity function (e.g., bit sampling for hamming distance) can be implemented to compute similarity of user uploaded media content (e.g., video clips) based on the combined audio fingerprint. For example, user uploaded media content can be compared with the combined audio fingerprint (e.g., using a hamming similarity function) in order to implement audio matching and/or identify matching media content (e.g., audio content and/or video content).

While FIG. 1 depicts separate components in system 100, it is to be appreciated that the components may be implemented in a common component. In one example, the media component 104, the fingerprint component 106 and/or the combination component 108 can be included in a single component. Further, it can be appreciated that the design of system 100 can include other component selections, component placements, etc., to add pitch shift resistance to an audio fingerprint.

Figure 2:
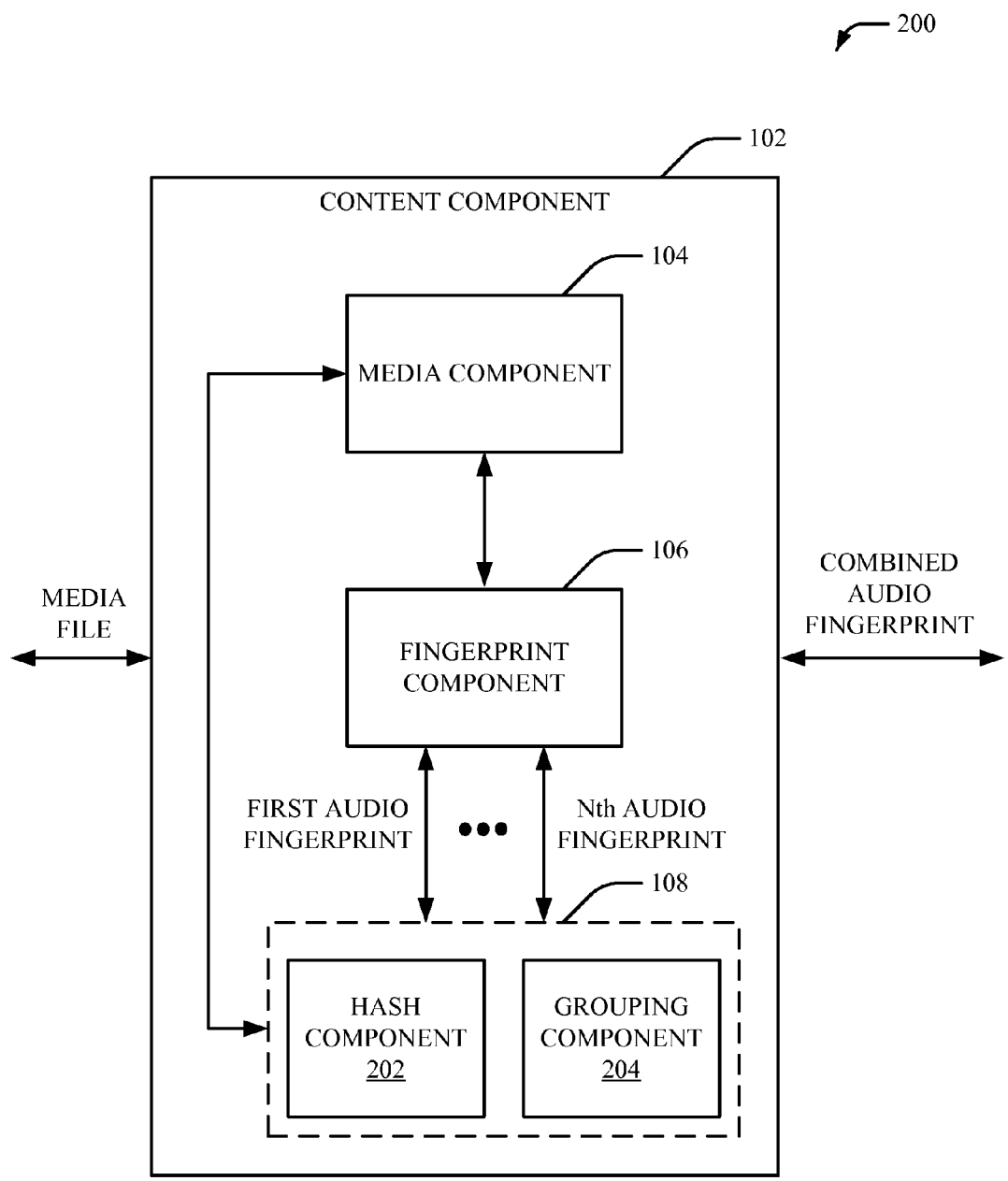
FIG. 2 illustrates a high-level block diagram of an example content component with a hash component and a grouping component for adding pitch shift resistance to an audio fingerprint, in accordance with various aspects and implementations described herein.

Referring to FIG. 2, there is illustrated a non-limiting implementation of a system 200 in accordance with various aspects and implementations of this disclosure. The system 200 includes the content component 102. The content component 102 can include the media component 104, the fingerprint component 106 and the combination component 108. The combination component 108 can include a hash component 202 and a grouping component 204.

The hash component 202 can be implemented to generate an audio fingerprint with pitch resistance based on a hashing scheme. The hash component 202 can implement various hashing schemes to select a corresponding sub-fingerprint value from the sequence of first sub-fingerprints or the sequence of Nth sub-fingerprints for each sub-fingerprint byte position of the combined audio fingerprint. In one example, the hash component 202 can implement a locality sensitive hashing (LSH) scheme. For example, a series of hashes that only examine a portion of a sub-fingerprint can be implemented. The LSH scheme can implement a random hashing scheme. For example, the hash component 202 can implement a random number generator (e.g., a deterministic random number generator). The random number generator can be implemented, for example, to perform random selection of a sub-fingerprint (e.g., the first sub-fingerprint or the Nth sub-fingerprint) for each sub-fingerprint byte position of the combined audio fingerprint. In yet another example, the hash component 202 can implement a min-hash (e.g., weighted min-hash, a min-wise independent permutation, etc.). For example, bit positions can be permutated to a random (but known) re-ordering in order to select a sub-fingerprint (e.g., the first sub-fingerprint or the Nth sub-fingerprint) for each sub-fingerprint byte position of the combined audio fingerprint.

The grouping component 204 can be implemented to generate an audio fingerprint with pitch resistance based on a grouping scheme. The grouping component 204 can partition each sub-fingerprint byte position of the sequence of first sub-fingerprints and the sequence of Nth sub-fingerprints into a plurality of groups. Each of the plurality of groups can include one or more byte values. Additionally, the grouping component 204 can partition the sub-fingerprint byte positions of the combined audio fingerprint into a plurality of groups. In one example, if a sub-fingerprint length of the combined audio fingerprint is 100 bytes, each sub-fingerprint of the combined audio fingerprint can be divided into 25 groups of four bytes (e.g., a first group can include bytes from index 0 to index 4, a second group can include bytes from index 5 to index 9, etc.). The grouping component 204 can select byte values from the sequence of first sub-fingerprints or the sequence of Nth sub-fingerprints for each group of the combined audio fingerprint. For example, each group of the combined audio fingerprint can be populated with sub-fingerprint byte values of the first audio fingerprint or the Nth audio fingerprint, and only one. In one example, the grouping component 204 can apply a hash to the strings formed by the group in the first audio fingerprint or the Nth audio fingerprint (e.g., A[0:4], B[0:4] and C[0:4]). The grouping component 204 can select the audio fingerprint (e.g., the first audio fingerprint or the Nth audio fingerprint) with the highest corresponding hash value (or lowest corresponding hash value).

Figure 3:
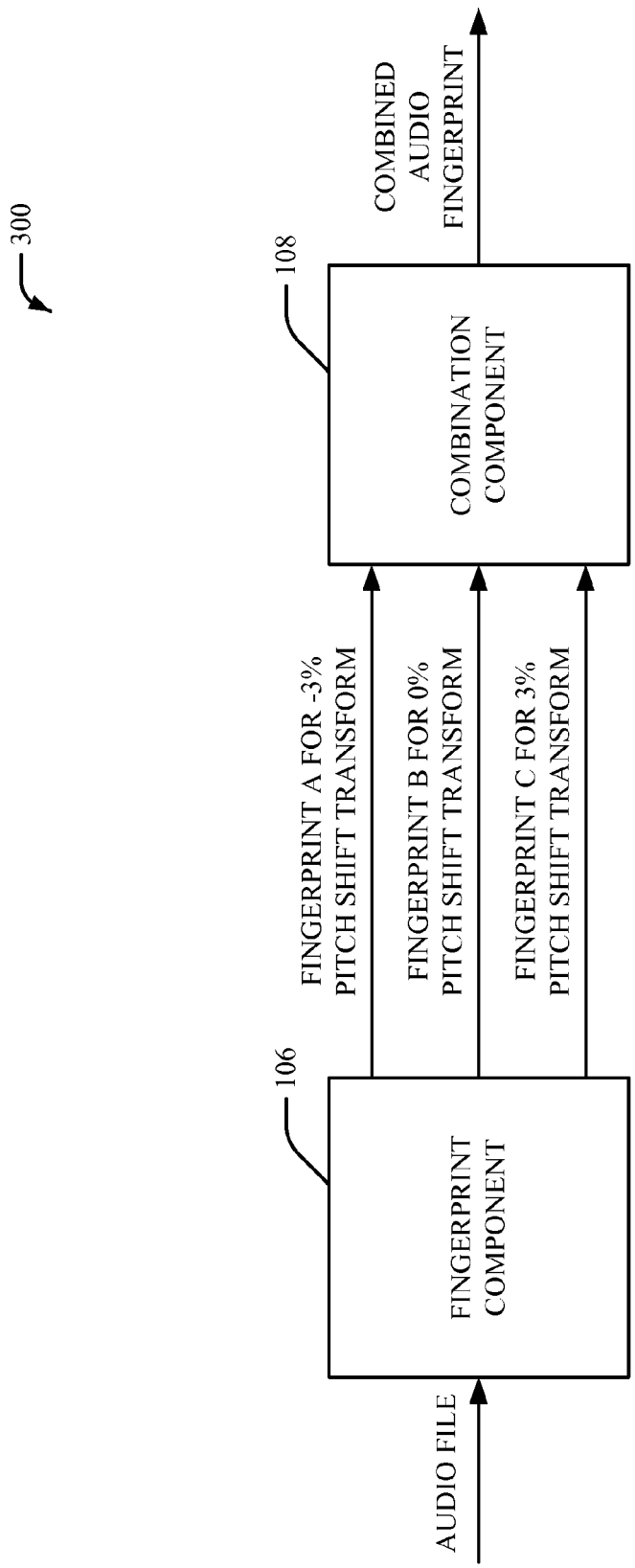
FIG. 3 illustrates an example system for generating a combined audio fingerprint based on a number of pitch shift transforms, in accordance with various aspects and implementations described herein.

Referring now to FIG. 3, there is illustrated a non-limiting implementation of a system 300 in accordance with various aspects and implementations of this disclosure. The system 300 includes the fingerprint component 106 and the combination component 108. The fingerprint component 106 can receive an audio file (e.g., AUDIO FILE shown in FIG. 3). For example, the audio file can be received from the media component 104. In one example, the audio file can be an audio file for a video clip. In another example, the audio file can be implemented as an audio fingerprint. Therefore, an existing audio fingerprint (e.g., stored on a server) can be enhanced for improved resistance to pitch shift. The fingerprint component 106 can generate two or more fingerprints (e.g., audio fingerprints) for the audio file. For example, the fingerprint component 106 can generate a fingerprint A, a fingerprint B and a fingerprint C (e.g., FINGERPRINT A, FINGERPRINT B and FINGERPRINT C shown in FIG. 3). The two or more fingerprints (e.g., fingerprint A, fingerprint B and fingerprint C) can include an equal number of sub-fingerprints. In a non-limiting example, fingerprint A can comprise a −3% pitch shift transform, fingerprint B can comprise a 0% pitch shift transform (e.g., no pitch transform) and fingerprint C can comprise a 3% pitch shift transform.

The combination component 108 can receive the two or more fingerprints (e.g., fingerprint A, fingerprint B and fingerprint C) generated by the fingerprint component 106. The combination component 108 can generate a combined audio fingerprint from the two or more fingerprints (e.g., fingerprint A, fingerprint B and fingerprint C). For example, the fingerprint A, the fingerprint B and the fingerprint C can be combined into a single fingerprint (e.g., the combined audio fingerprint). The combined audio fingerprint can comprise the same tempo as the audio file (e.g., fingerprint A, fingerprint B and fingerprint C), but a different pitch. In one example, the combination component 108 can generate the combined audio fingerprint based on a hashing scheme (e.g., using the hash component 202), as more fully disclosed herein. In another example, the combination component 108 can generate the combined audio fingerprint based on a grouping scheme (e.g., using the grouping component 204), as more fully disclosed herein. It is to be appreciated that the fingerprint component 106 can generate a different number of fingerprints (e.g., more or less than three fingerprints). It is also to be appreciated that the fingerprint component 106 can implement a different amount of pitch shift transform for each fingerprint (e.g., a +/−5% pitch shift transform, etc.).

Figure 4:
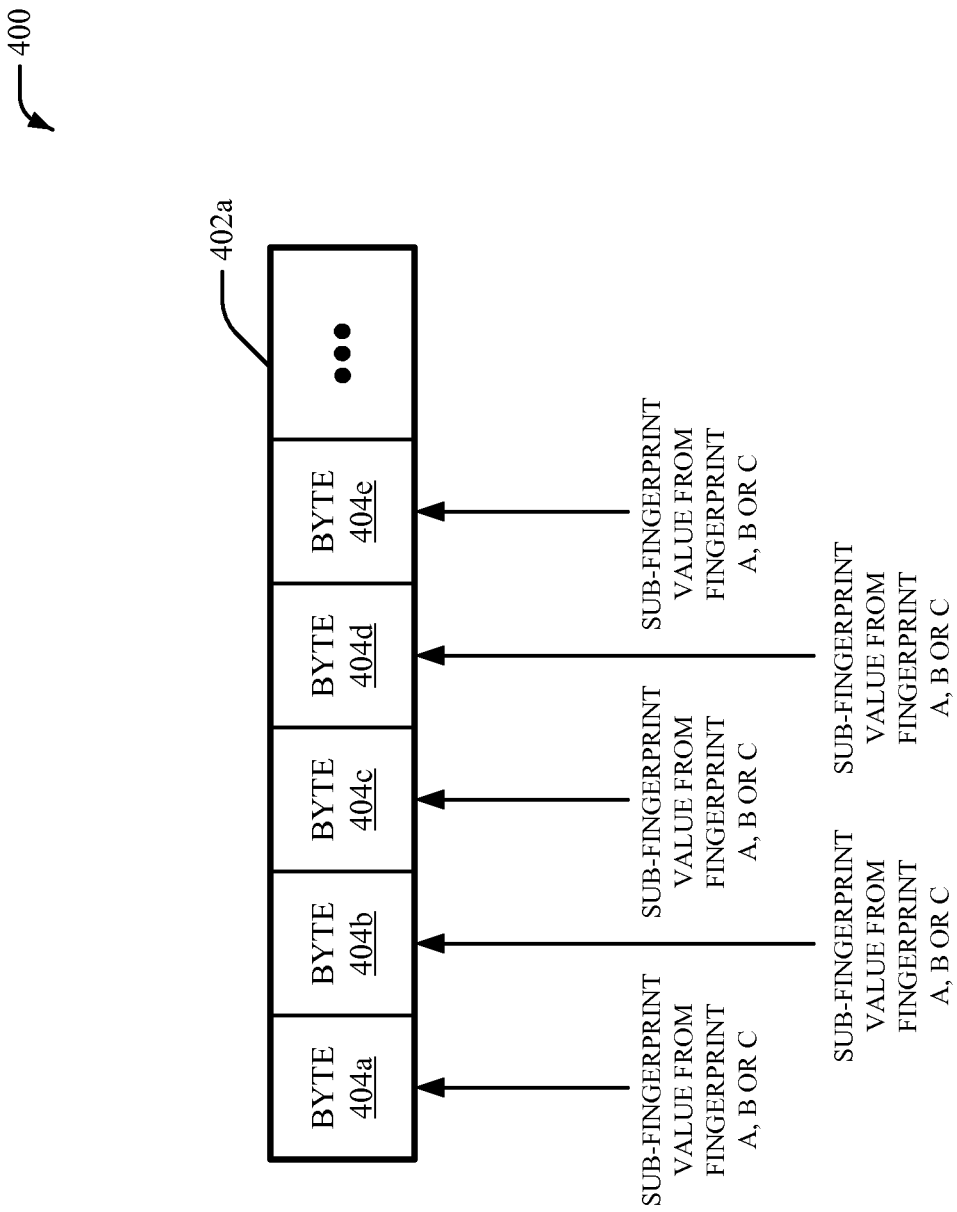
FIG. 4 illustrates an example technique for adding pitch shift resistance to an audio fingerprint, in accordance with various aspects and implementations described herein.

Referring now to FIG. 4, there is illustrated a non-limiting implementation of a combined audio fingerprint 400 in accordance with various aspects and implementations of this disclosure. The combined audio fingerprint 400 shown in FIG. 4 includes a sub-fingerprint 402a. However, it is to be appreciated that the combined audio fingerprint 400 can include more than one sub-fingerprint. The sub-fingerprint 402a shown in FIG. 4 includes bytes 404a-e. For example, the bytes 404a-e can represent bytes spanning from index 0 to index 4. However, it is to be appreciated that a sub-fingerprint can include a different number of bytes (e.g., 100 bytes).

In a non-limiting example in connection with FIG. 3, each byte 404a-e can be filled with a sub-fingerprint value from the fingerprint A, the fingerprint B or the fingerprint C. For example, each byte 404a-e can include data (e.g., a byte value) from either the fingerprint A, the fingerprint B or the fingerprint C. The sub-fingerprint for the fingerprint A, the fingerprint B and the fingerprint C can correspond to the same point in time as the sub-fingerprint 402a. For example, if the sub-fingerprint 402a is the first sub-fingerprint of the combined audio fingerprint 400, then the sub-fingerprint 402a can be generated as a function of the first sub-fingerprint of the fingerprint A, the first sub-fingerprint of the fingerprint B and/or the first sub-fingerprint of the fingerprint C. In another example, if the sub-fingerprint 402a is the tenth sub-fingerprint of the combined audio fingerprint 400, then the sub-fingerprint 402a can be generated as a function of the tenth sub-fingerprint of the fingerprint A, the tenth sub-fingerprint of the fingerprint B and/or the tenth sub-fingerprint of the fingerprint C. Therefore, the bytes 404a-e can include sub-fingerprint values with different levels of pitch shifting (e.g., bytes 404a-e can include sub-fingerprint data based on fingerprints with different pitches).

Selection of the fingerprint A, the fingerprint B or the fingerprint C can be based on a hashing function. In one example, selection of the fingerprint A, the fingerprint B or the fingerprint C can be random, but deterministic. For example, a random number generator can be implemented to perform random selection of the fingerprint A, the fingerprint B or the fingerprint C. A first byte value can be associated with the fingerprint A, a second byte value can be associated with the fingerprint B and a third byte value can be associated with the fingerprint C. A random number generator can be seeded with the first byte value, the second byte value and the third byte value. The fingerprint A, the fingerprint B or the fingerprint C can be selected based on which corresponding byte value generates the highest (or lowest) random value. For example, if the first byte value generates the highest (or lowest) random value, a particular one of the bytes 404a-e can be filled with data from the fingerprint A. However, it is to be appreciated that different types of techniques can be implemented to select a particular fingerprint based on a random number generator.

Figure 5:
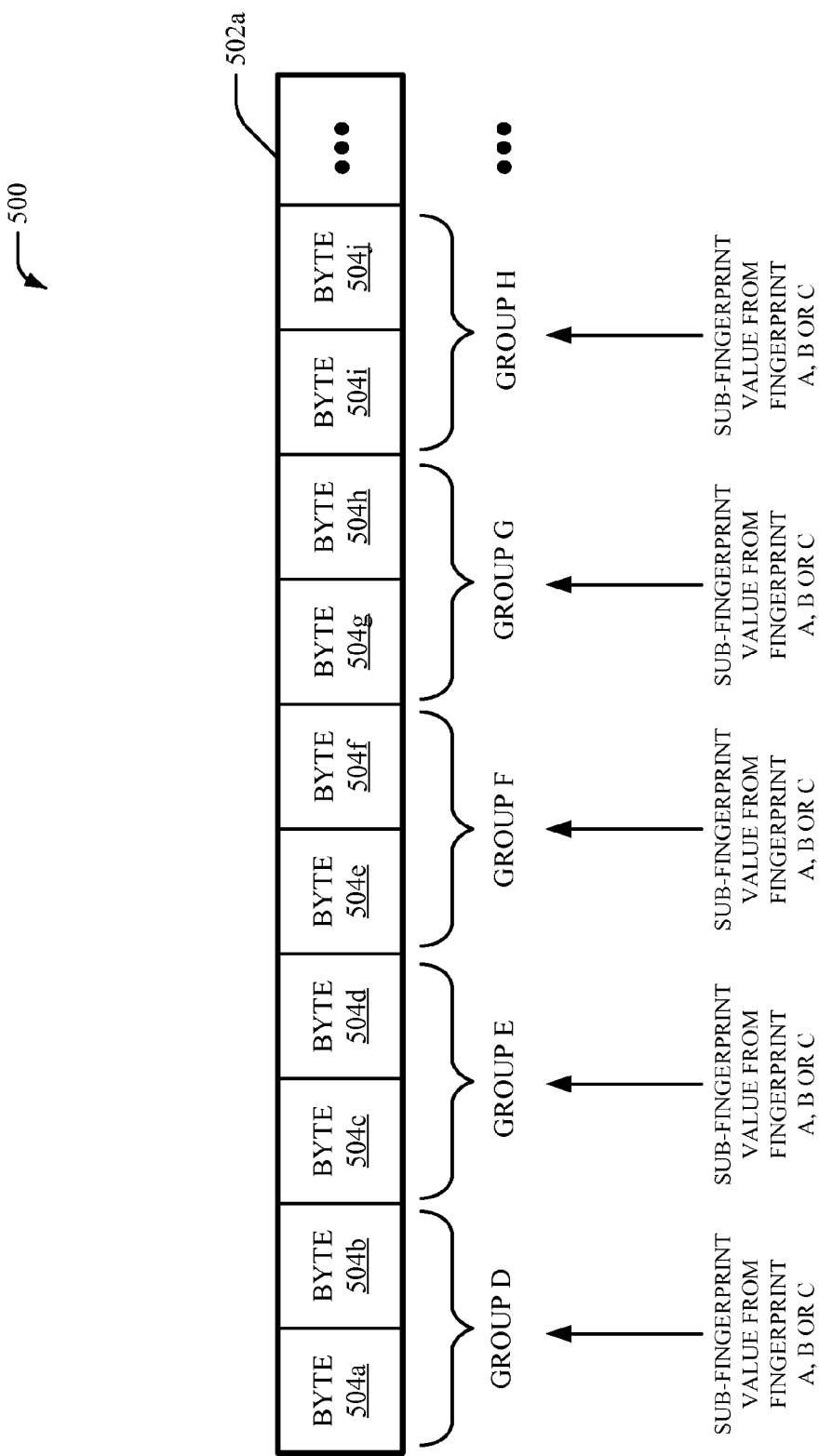
FIG. 5 illustrates another example technique for adding pitch shift resistance to an audio fingerprint, in accordance with various aspects and implementations described herein.

Referring now to FIG. 5, there is illustrated a non-limiting implementation of a combined audio fingerprint 500 in accordance with various aspects and implementations of this disclosure. The combined audio fingerprint 500 shown in FIG. 5 includes a sub-fingerprint 502a. However, it is to be appreciated that the combined audio fingerprint 500 can include a different number of sub-fingerprints. The sub-fingerprint 502a shown in FIG. 5 includes bytes 504a-j. For example, the bytes 504a-j can represent bytes spanning from index 0 to index 9. However, it is to be appreciated that a sub-fingerprint can include a different number of bytes (e.g., 100 bytes). The sub-fingerprint 502a (e.g., the bytes 504a-j) can be divided into a number of groups. For example, group D can comprise byte 504a and byte 504b, group E can comprise byte 504c and byte 504d, group F can comprise byte 504e and byte 504f, group G can comprise byte 504g and byte 504h and group H can comprise byte 504i and byte 504j. However, it is to be appreciated that a different number of groups can be implemented. Further, it is to be appreciated that a different number of bytes can be included in each group (e.g., more or less than two bytes).

In a non-limiting example in connection with FIG. 3, each group (e.g., groups D-H) can be filled with a sub-fingerprint value from the fingerprint A, the fingerprint B or the fingerprint C. For example, group D can be filled with byte values from fingerprint A, group E can be filled with byte values from fingerprint C, group F can be filled with byte values from fingerprint A, group G can be filled with byte values from fingerprint B and group H can be filled with byte values from fingerprint B. However, it is to be appreciated that different scenarios are possible. Therefore, each group can be filled with values (e.g., byte values) from fingerprint A, fingerprint B or fingerprint C. The sub-fingerprint (e.g., sub-fingerprint values) of the fingerprint A, the sub-fingerprint (e.g., sub-fingerprint values) of fingerprint B and the sub-fingerprint (e.g., sub-fingerprint values) of fingerprint C can correspond to the same point in time as the sub-fingerprint 502a. As such, the sub-fingerprint 502a can be generated by combining a sub-fingerprint of the fingerprint A, a sub-fingerprint of the fingerprint B and/or a sub-fingerprint of the fingerprint C with a corresponding time interval. For example, if the sub-fingerprint 502a is the third sub-fingerprint of the combined audio fingerprint 500, then the sub-fingerprint 502a can be generated using data from the third sub-fingerprint of the fingerprint A, data from the third sub-fingerprint of the fingerprint B and/or data from the third sub-fingerprint of the fingerprint C. In another example, if the sub-fingerprint 502a is the one-hundredth sub-fingerprint of the combined audio fingerprint 500, then the sub-fingerprint 502a can be generated using data from the one-hundredth sub-fingerprint of the fingerprint A, data from the one-hundredth sub-fingerprint of the fingerprint B and/or data from the one-hundredth sub-fingerprint of the fingerprint C. As such, the sub-fingerprint 502a includes byte values with different degrees of pitch.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 6-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 6:
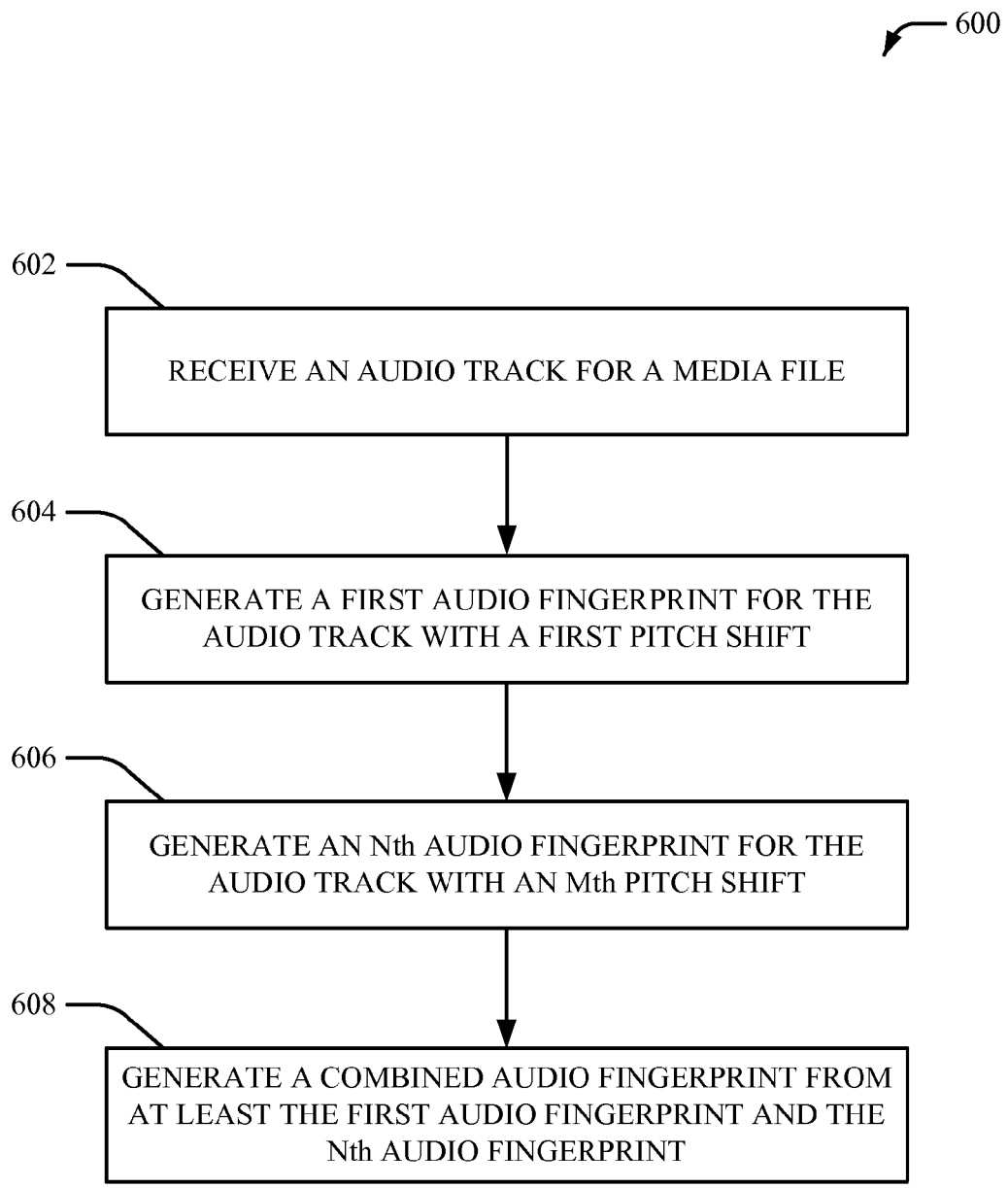
FIG. 6 depicts a flow diagram of an example method for adding pitch shift resistance to an audio fingerprint, in accordance with various aspects and implementations described herein.

Referring to FIG. 6, there illustrated is a methodology 600 for adding pitch shift resistance to an audio fingerprint, according to an aspect of the subject innovation. As an example, methodology 600 can be utilized in various applications, such as, but not limited to, audio matching systems, content management systems, network systems, computer network systems, communication systems, router systems, server systems, high availability server systems (e.g., Telecom server systems), Web server systems, file server systems, media server systems, disk array systems, powered insertion board systems, cloud-based systems, etc. Specifically, the methodology 600 can generate an audio fingerprint with data (e.g., byte values) from fingerprints with different pitches (e.g., different degrees of pitch shifting).

At 602, an audio track can be received (e.g., by a media component 104). For example, an audio track embedded in a media file (e.g., a video file) can be received. At 604, a first audio fingerprint for the audio track with a first pitch shift can be generated (e.g., by a fingerprint component 106). For example, an audio fingerprint with a higher or lower pitch than the pitch of the audio track can be generated. At 606, an Nth audio fingerprint for the audio track with an Mth pitch shift can be generated (e.g., by a fingerprint component 106). For example, another audio fingerprint with a higher or lower pitch than the pitch of the audio track can be generated. At 608, a combined audio fingerprint can be generated (e.g., by a combination component 108) from at least the first audio fingerprint and the Nth audio fingerprint. For example, the combined audio fingerprint can comprise data from at least the first audio fingerprint and the Nth audio fingerprint (e.g., fingerprints with different pitches).

Figure 7:
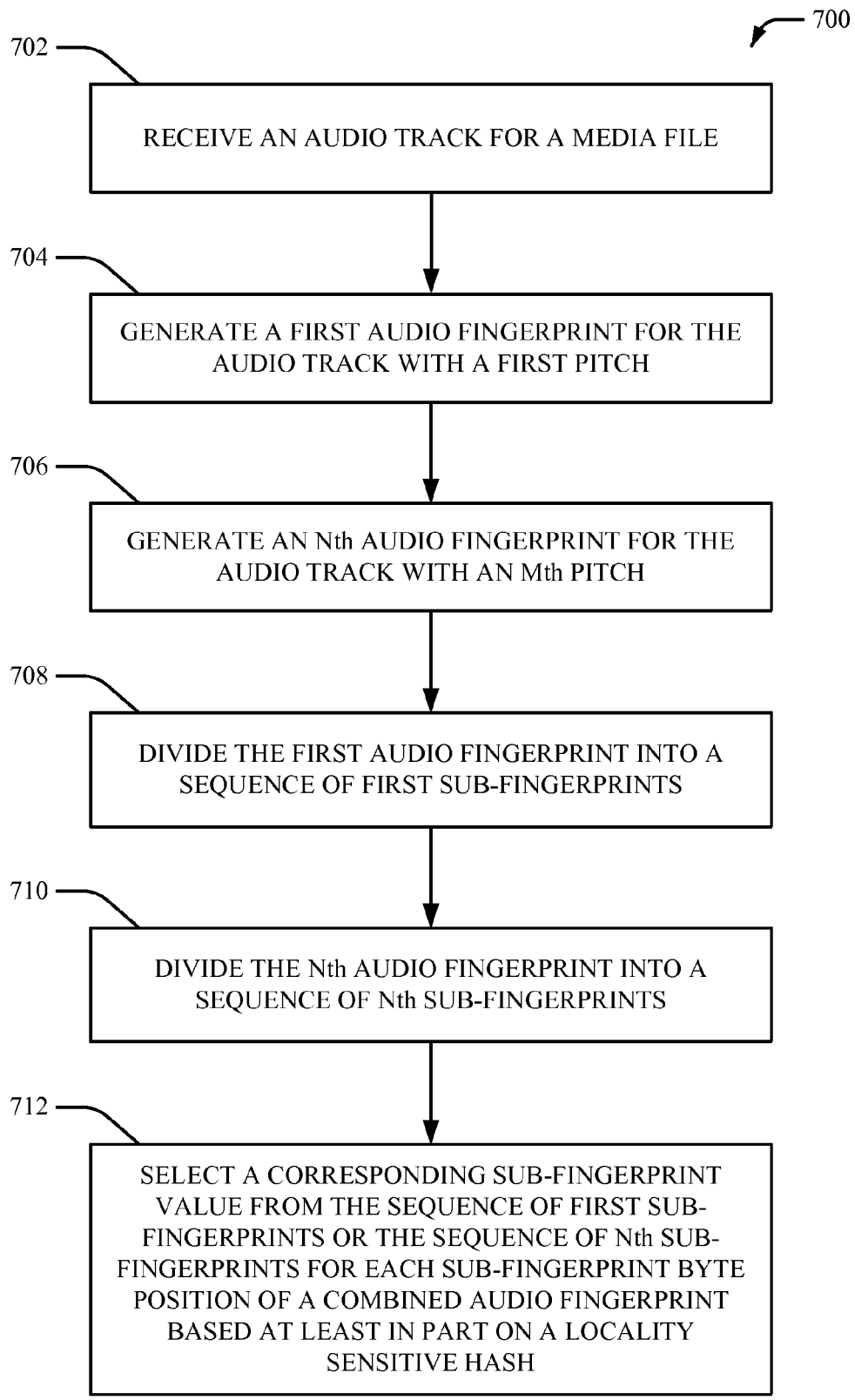
FIG. 7 depicts a flow diagram of an example method for adding pitch shift resistance to an audio fingerprint based at least in part on a hashing scheme, in accordance with various aspects and implementations described herein.

Referring to FIG. 7, there illustrated is an example methodology 700 for combining audio fingerprint data from multiple audio fingerprints into a combined audio fingerprint. At 702, an audio track can be received (e.g., by an media component 104). For example, an audio track embedded in a media file (e.g., a video file) can be received. At 704, a first audio fingerprint for the audio track with a first pitch can be generated (e.g., by a fingerprint component 106). For example, an audio fingerprint with a higher or lower pitch than the pitch of the audio track can be generated. At 706, an Nth audio fingerprint for the audio track with an Mth pitch can be generated (e.g., by a fingerprint component 106). For example, another audio fingerprint with a higher or lower pitch than the pitch of the audio track can be generated. At 708, the first audio fingerprint can be divided (e.g., by a fingerprint component 106) into a sequence of first sub-fingerprints. For example, the sequence of first sub-fingerprints can be equally sized encoded portions of the audio track. At 710, the Nth audio fingerprint can be divided (e.g., by a fingerprint component 106) into a sequence of Nth sub-fingerprints. For example, the sequence of Nth sub-fingerprints can be equally sized encoded portions of the audio track. At 712, a corresponding sub-fingerprint value from the sequence of first sub-fingerprints or the sequence of Nth sub-fingerprints can be selected (e.g., by a combination component 108) for each sub-fingerprint byte position of a combined audio fingerprint based at least in part on a locality sensitive hash. For example, a random number generator can be implemented to select a corresponding sub-fingerprint value from the sequence of first sub-fingerprints or the sequence of Nth sub-fingerprints. In another example, a min-hash (e.g., a weighted min-hash) can be implemented to select a corresponding sub-fingerprint value from the sequence of first sub-fingerprints or the sequence of Nth sub-fingerprints.

Figure 8:
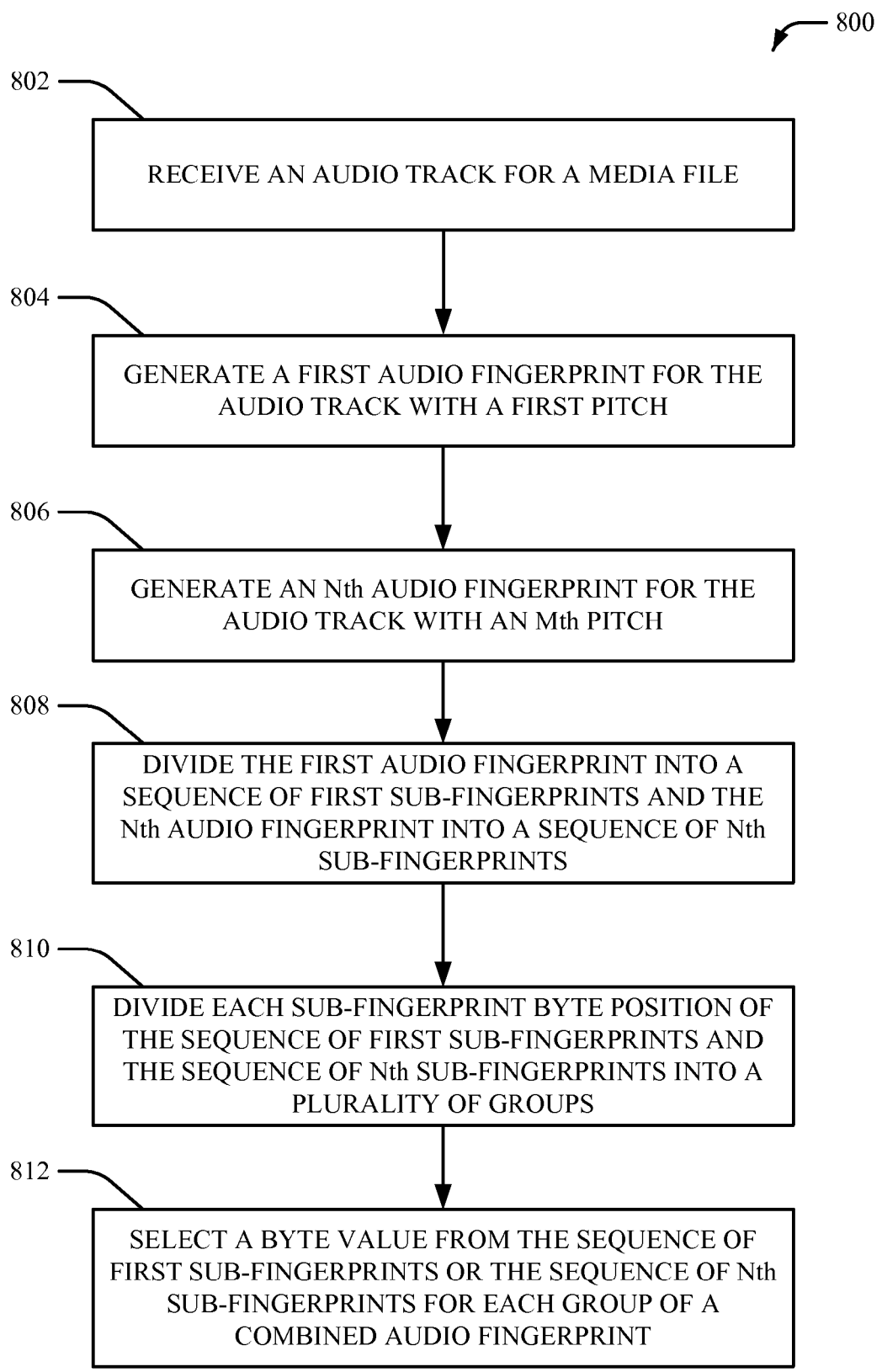
FIG. 8 depicts a flow diagram of an example method for adding pitch shift resistance to an audio fingerprint based at least in part on a grouping scheme, in accordance with various aspects and implementations described herein.

Referring to FIG. 8, there illustrated is another example methodology 800 for combining audio fingerprint data from multiple audio fingerprints into a combined audio fingerprint. At 802, an audio track can be received (e.g., by an media component 104). For example, an audio track embedded in a media file (e.g., a video file) can be received. At 804, a first audio fingerprint for the audio track with a first pitch can be generated (e.g., by a fingerprint component 106). For example, an audio fingerprint with a higher or lower pitch than the pitch of the audio track can be generated. At 806, an Nth audio fingerprint for the audio track with an Mth pitch can be generated (e.g., by a fingerprint component 106). For example, another audio fingerprint with a higher or lower pitch than the pitch of the audio track can be generated. At 808, the first audio fingerprint can be divided (e.g., by a fingerprint component 106) into a sequence of first sub-fingerprints and the Nth audio fingerprint can be divided (e.g., by a fingerprint component 106) into a sequence of Nth sub-fingerprints. For example, the sequence of first sub-fingerprints and the sequence of Nth sub-fingerprints can be equally sized encoded portions of the audio track. At 810, each sub-fingerprint byte position of the sequence of first sub-fingerprints and the sequence of Nth sub-fingerprints can be divided (e.g., by a combination component 108) into a plurality of groups. For example, a group can include a plurality of byte values of a sub-fingerprint. At 812, a byte value can be selected (e.g., by a combination component 108) from the sequence of first sub-fingerprints or the sequence of Nth sub-fingerprints for each group of a combined audio fingerprint. For example, each group in a sub-fingerprint of the combined audio fingerprint can include byte values from the sequence of first sub-fingerprints or the sequence of Nth sub-fingerprints.

Figure 9:
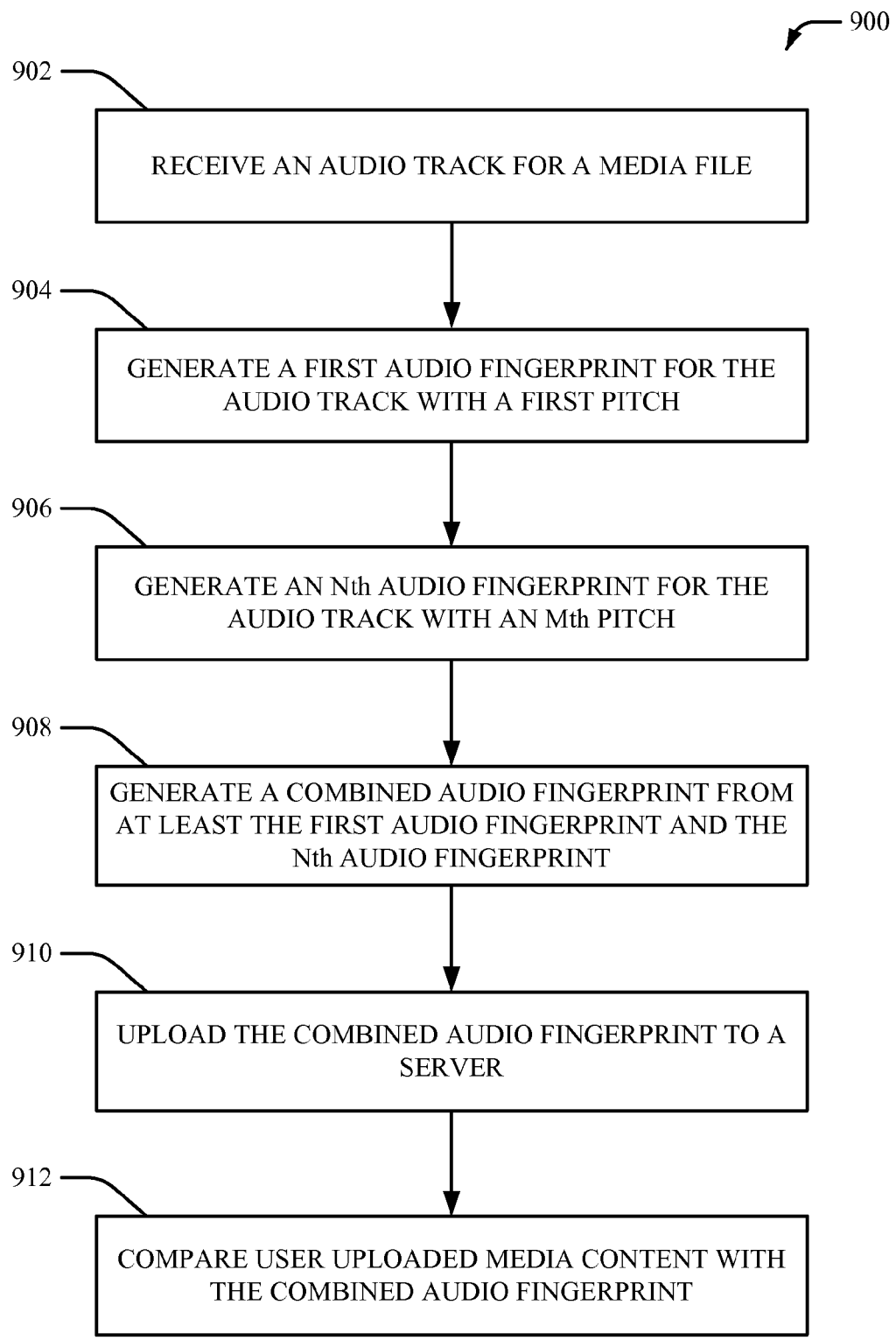
FIG. 9 depicts a flow diagram of an example method for adding pitch shift resistance to an audio fingerprint in an audio matching system, in accordance with various aspects and implementations described herein.

Referring to FIG. 9, there illustrated is an example methodology 900 for adding pitch shift resistance to audio fingerprints in an audio matching system. At 902, an audio track can be received (e.g., by an media component 104). For example, an audio track embedded in a media file (e.g., a video file) can be received. At 904, a first audio fingerprint for the audio track with a first pitch can be generated (e.g., by a fingerprint component 106). For example, an audio fingerprint with a higher or lower pitch than the pitch of the audio track can be generated. At 906, an Nth audio fingerprint for the audio track with an Mth pitch can be generated (e.g., by a fingerprint component 106). For example, another audio fingerprint with a higher or lower pitch than the pitch of the audio track can be generated. At 908, a combined audio fingerprint can be generated (e.g., by a combination component 108) from at least the first audio fingerprint and the Nth audio fingerprint. For example, the combined audio fingerprint can comprise data from at least the first audio fingerprint and the Nth audio fingerprint. At 910, the combined audio fingerprint can be uploaded (e.g., by a combination component 108) to a server. For example, the combined audio fingerprint can be uploaded to a server in an audio matching system (e.g., a server in a media sharing system). At 912, user uploaded media content can be compared with the combined audio fingerprint. For example, the combined audio fingerprint can be implemented to identify matching media content uploaded by a user of a media sharing system (e.g., using a hashing scheme, a grouping scheme, locality-sensitive hashing, a hamming similarity function, a min-hash, a random number generator, etc.).

Figure 10:
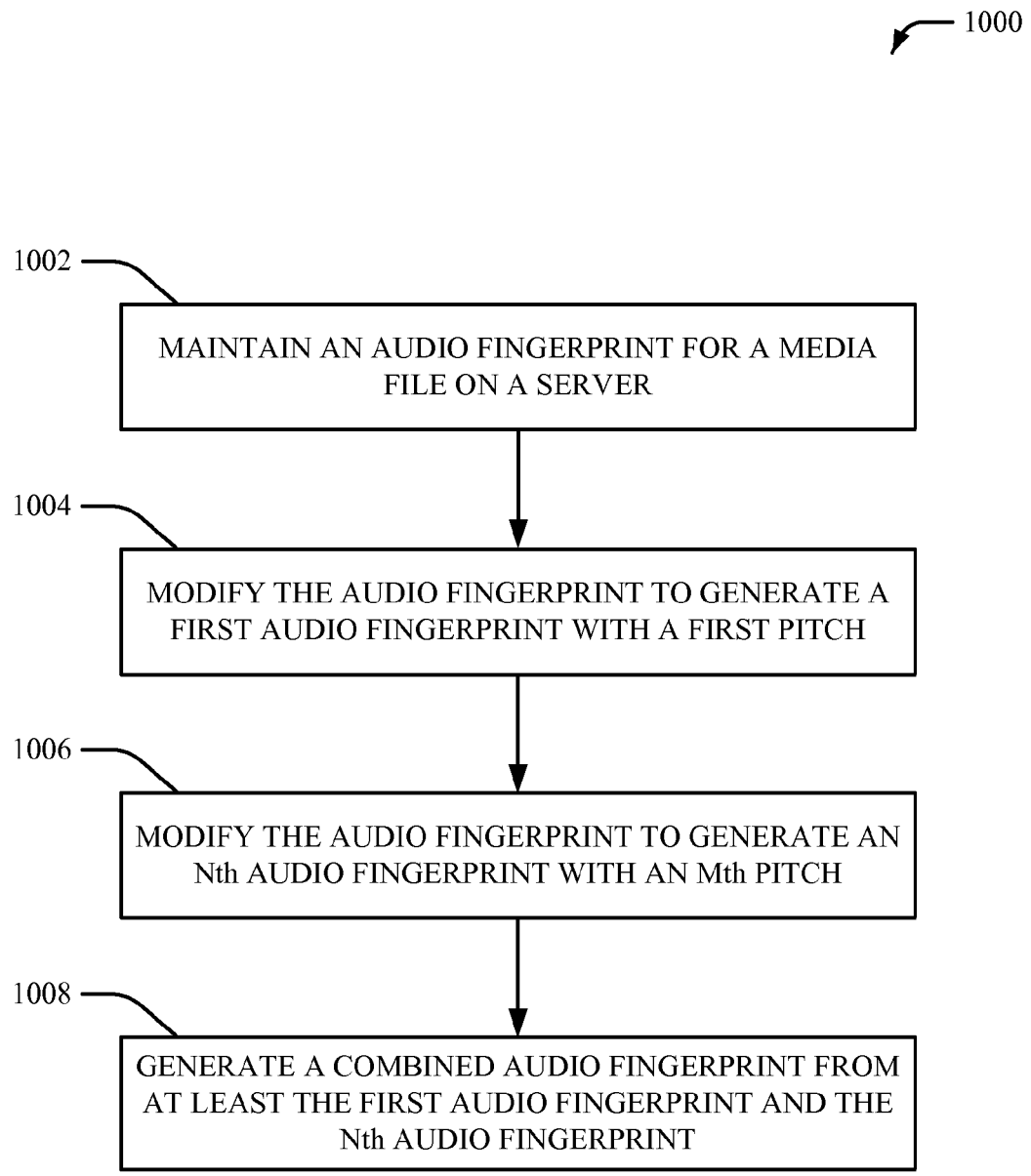
FIG. 10 depicts a flow diagram of an example method for adding pitch shift resistance to an existing audio fingerprint, in accordance with various aspects and implementations described herein.

Referring to FIG. 10, there illustrated is an example methodology 1000 for adding pitch shift resistance to an existing audio fingerprint. At 1002, an audio fingerprint for a media file can be maintained (e.g., by an media component 104) on a server. For example, an audio fingerprint for a video file can be maintained on a server for an audio matching system. At 1004, the audio fingerprint can be modified (e.g., by a fingerprint component 106) to generate a first audio fingerprint with a first pitch. For example, a modified audio fingerprint with a higher or lower pitch than the pitch of the audio fingerprint can be generated. At 1006, the audio fingerprint can be modified (e.g., by a fingerprint component 106) to generate an Nth audio fingerprint with an Mth pitch. For example, another modified audio fingerprint with a higher or lower pitch than the pitch of the audio fingerprint can be generated. At 1008, a combined audio fingerprint can be generated (e.g., by a combination component 108) from at least the first audio fingerprint and the Nth audio fingerprint. For example, the combined audio fingerprint can include byte values from at least the first audio fingerprint and the Nth audio fingerprint.

Figure 11:
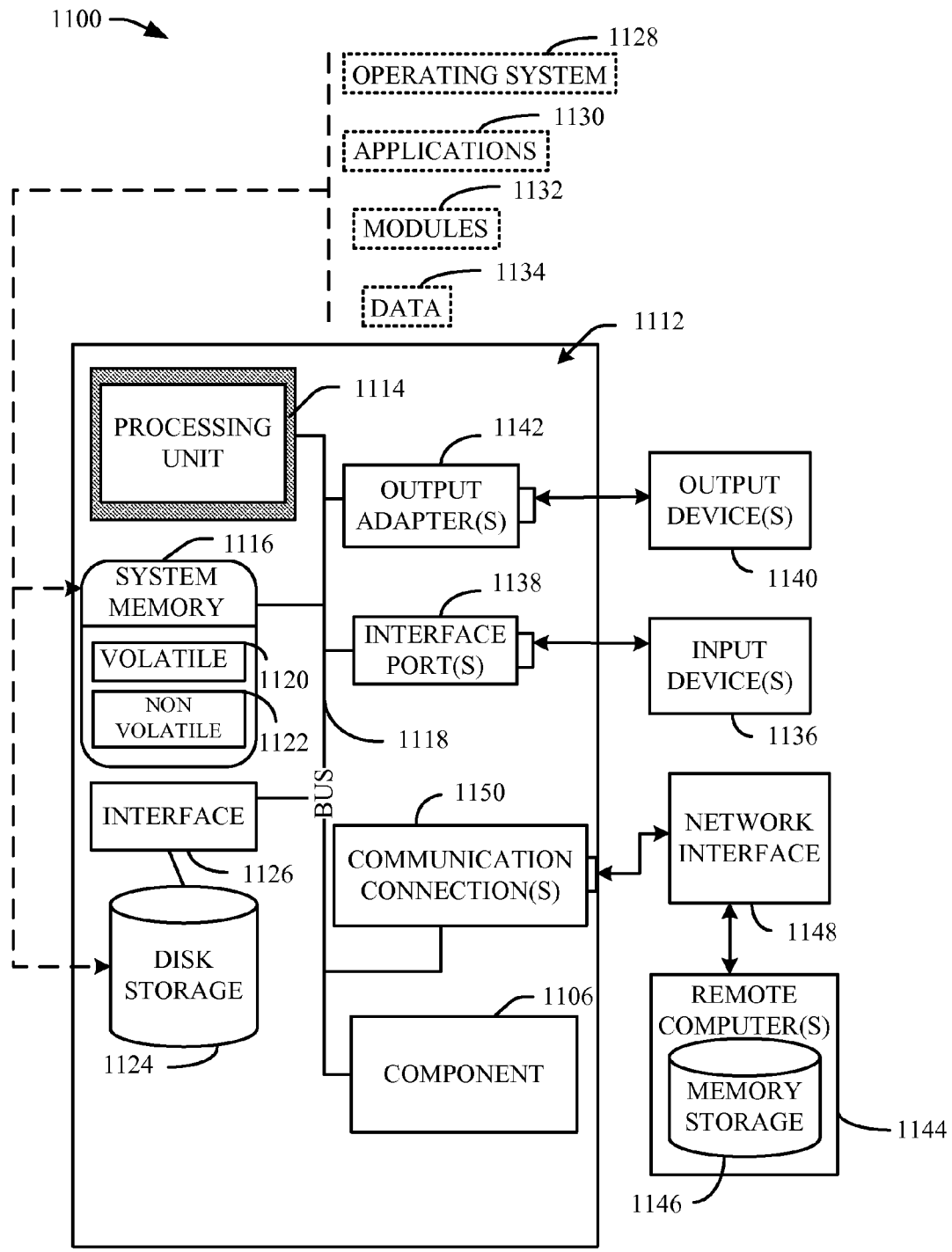
FIG. 11 is a schematic block diagram illustrating a suitable operating environment.
Figure 12:
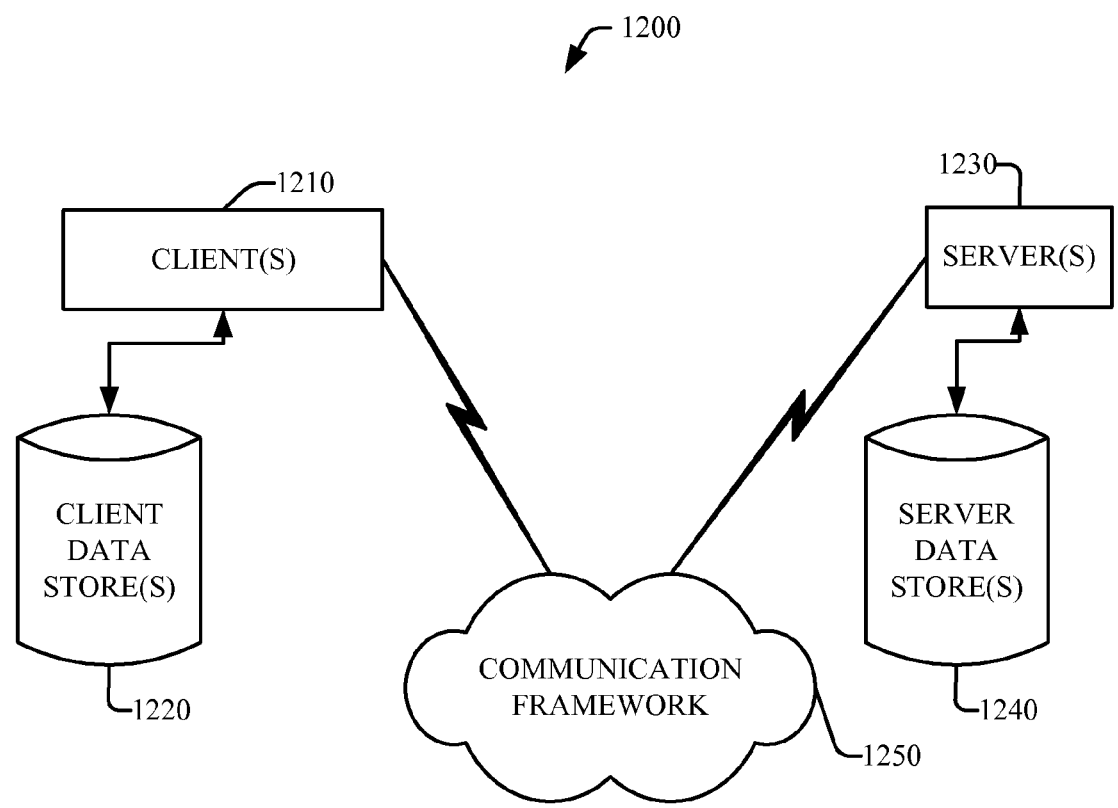
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

It is to be appreciated that the computer 1112 can be used in connection with implementing one or more of the systems or components shown and described in connection with FIGS. 1-5. In accordance with various aspects and implementations, the computer 1112 can be used to add pitch shift resistance to audio fingerprints. In certain exemplary embodiments, the computer 1112 includes a component 1106 (e.g., the content component 102) that can contain, for example, a media component, a fingerprint component, a combination component, a hash component and/or a grouping component, each of which can respectively function as more fully disclosed herein.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., content component, media component, fingerprint component, combination component, hash component and/or grouping component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory storing computer executable components; and
a processor configured to execute the following computer executable components stored in the memory:
   a fingerprint component configured to generate a first audio fingerprint for an audio file that is associated with a first pitch shift and a second audio fingerprint for the audio file that is associated with a second pitch shift;
   a combination component configured to generate a combined audio fingerprint based on the first audio fingerprint and the second audio fingerprint, wherein the combination component selects a sub-fingerprint value from the first audio fingerprint or the second audio fingerprint for a byte value of the combined audio fingerprint based on a locality sensitive hash; and
   an audio matching component configured to compare the audio file to a set of audio files based on the combined audio fingerprint.

2. The system of claim 1, wherein the fingerprint component is configured to generate a first sequence of sub-fingerprints for the first audio fingerprint and to generate a second sequence of sub-fingerprints for the second audio fingerprint.

3. The system of claim 1, wherein the fingerprint component is configured to generate a third audio fingerprint for the audio file that is associated with a third pitch shift.

4. The system of claim 1, wherein the fingerprint component is configured to generate the first audio fingerprint with a higher pitch than a pitch of the audio file.

5. The system of claim 1, wherein the fingerprint component is configured to generate the first audio fingerprint with a lower pitch than a pitch of the audio file.

6. The system of claim 1, wherein the fingerprint component is configured to generate the second audio fingerprint with a pitch that is equal to an original pitch of the audio file.

7. The system of claim 1, wherein the combination component is configured to select the sub-fingerprint value from a first sequence of sub-fingerprints of the first audio fingerprint or a second sequence of sub-fingerprints of the second audio fingerprint.

8. The system of claim 1, wherein the combination component is configured to randomly select the sub-fingerprint value from the first audio fingerprint or the second audio fingerprint based on a random number generator.

9. The system of claim 1, wherein the combination component is configured to divide a sub-fingerprint byte position of the first audio fingerprint into a plurality of groups that includes a plurality of byte values.

10. The system of claim 1, wherein the audio matching component is configured to employ the combined audio fingerprint to match the audio file to at least one other audio file from the set of audio files.

11. A method, comprising:
employing a processor that facilitates execution of computer executable instructions stored on a non-transitory computer readable medium to implement operations, comprising:
   generating, by a system including a processor, a first audio fingerprint for an audio track with a first pitch shift;
   generating, by the system, a second audio fingerprint for the audio track with a second pitch shift;
   generating, by the system, a combined audio fingerprint by selecting a sub-fingerprint value from the first audio fingerprint or the second audio fingerprint for each byte value of the combined audio fingerprint based on a locality sensitive hashing scheme; and
   determining, by the system, whether the audio track matches at least one other audio track from a set of other audio tracks by comparing the combined audio fingerprint to the set of other audio tracks.

12. The method of claim 11, wherein the generating the first audio fingerprint comprises generating the first audio fingerprint with an audio pitch that is higher than an original audio pitch of the audio track.

13. The method of claim 11, wherein the generating the first audio fingerprint comprises generating the first audio fingerprint with an audio pitch that is lower than an original audio pitch of the audio track.

14. The method of claim 11, wherein the generating the second audio fingerprint comprises generating the second audio fingerprint with an audio pitch that corresponds to an original audio pitch of the audio track.

15. The method of claim 11, wherein the selecting the sub-fingerprint value comprises selecting the sub-fingerprint value from a first sequence of sub-fingerprints of the first audio fingerprint or a second sequence of sub-fingerprints of the second audio fingerprint.

16. The method of claim 11, wherein the selecting the sub-fingerprint value comprises randomly selecting the sub-fingerprint value from the first audio fingerprint or the second audio fingerprint.

17. The method of claim 11, further comprising:
generating, by the system, a third audio fingerprint for the audio track with a third pitch shift.

18. A non-transitory computer-readable medium having instructions stored thereon that, in response to execution, cause a system including a processor to perform operations comprising:
   generating a first sequence of audio fingerprints for an audio file that is associated with a first pitch shift;
   generating a second sequence of audio fingerprints for the audio file that is associated with a second pitch shift;
   generating a combined audio fingerprint by selecting a sub-fingerprint value from the first sequence of audio fingerprints or the second sequence of audio fingerprints for each byte value of the combined audio fingerprint based on a locality sensitive hash; and
   comparing the combined audio fingerprint to a set of audio files.

19. The non-transitory computer-readable medium of claim 18, wherein the generating the first sequence of audio fingerprints comprises generating the first sequence of audio fingerprints with an audio pitch that is different than an original audio pitch of the audio file.

20. The non-transitory computer-readable medium of claim 18, wherein the selecting the sub-fingerprint value comprises selecting the sub-fingerprint value from the first sequence of audio fingerprints or the second sequence of audio fingerprints based on a random hashing scheme.

* * * * *